(12) United States Patent
Matsushita

(10) Patent No.: US 7,268,639 B2
(45) Date of Patent: Sep. 11, 2007

(54) PULSE WIDTH MODULATION CIRCUIT

(75) Inventor: Yuichi Matsushita, Miyazaki (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 32 days.

(21) Appl. No.: 11/320,658

(22) Filed: Dec. 30, 2005

(65) Prior Publication Data

US 2006/0152184 A1  Jul. 13, 2006

(30) Foreign Application Priority Data

Jan. 13, 2005  (JP)  ............................. 2005-006777

(51) Int. Cl.
*H03K 7/08* (2006.01)
*H03K 3/017* (2006.01)
*H03K 5/04* (2006.01)
*H03K 3/02* (2006.01)

(52) U.S. Cl. ................ 332/109; 327/172; 327/175; 331/111; 331/143; 331/150

(58) Field of Classification Search ........... 332/109, 332/110; 318/599; 375/238; 327/172, 175; 331/111, 143, 150, 153
See application file for complete search history.

(56) References Cited

U.S. PATENT DOCUMENTS

| | | | |
|---|---|---|---|
| 6,853,227 B2 * | 2/2005 | Laletin | 327/175 |
| 7,106,038 B1 * | 9/2006 | Xin-LeBlanc | 323/288 |
| 7,106,130 B2 * | 9/2006 | Gan et al. | 330/10 |
| 2004/0201407 A1 * | 10/2004 | Lee et al. | 327/172 |

\* cited by examiner

*Primary Examiner*—Benny Lee
*Assistant Examiner*—Ryan J Johnson
(74) *Attorney, Agent, or Firm*—Rabin & Berdo, P.C.

(57) ABSTRACT

The present invention provides a pulse width modulation (PWM) circuit comprising an PWM control circuit for setting an output signal to low when a logical level of a oscillation signal at a first input terminal changes from low to high, for resetting the output level to low in response to an effective input signal at a second terminal, a charge and discharge means for charging a first node (node1) when the output stays in low, for discharging the stored charge of node1 when the output stays in high, a comparator (C1) for outputting an output signal to the second terminal according to the first node signal and a first reference signal (Vref0), a discharge current controlling means for the stored charge on the first node, wherein the discharge current controlling means comprises a bias circuit 2 for controlling the discharge current based on constant current.

5 Claims, 5 Drawing Sheets

PULSE WIDTH MODULATION CIRCUIT

BACKGROUND OF THE INVENTION

The present invention relates to a pulse width modulation circuit (referred to below as PWM circuit) for modulating pulse width, more specially the invention relates to a PWM circuit that modulate pulse width at low frequency.

FIG. 9 is a diagram showing an example of related PWM circuit. This circuit comprises a triangle wave generator with an input of oscillation signal (referred to below as OSC) and a comparator C1, the input of which is the output signal (node1) of the triangle wave generator (referred to below as TWG) and a signal Vin. FIG. 10 shows an example circuit of the TWG.

The operation of the circuit of FIG. 9 is described below with reference to the FIG. 11. The TWG outputs a triangle wave signal on node1 according to the "high" and "low" level of input signal OSC. The comparator C1 compares the level of input signal Vin at non-inverting input terminal and the level of input signal of node1 at inverting input terminal, and outputs "high" level signal or "low" level signal according to the comparison result.

To be more precise, when OSC signal level is "high", the signal level of node1 decreases gradually and increases gradually at the "low" level section of OSC signal. The triangle wave signal is generated with the repetition of this operation.

The comparator C1 outputs "high" level signal when the level of the output signal of the TWG is lower than that of input signal Vin, thus "high" level output section occupies, for example, about 40% per one cycle of OSC signal (Duty=40%). This is the case of lower level input of the signal Vin. On the other hand, in case of higher input level of Vin, "high" level output section is extended, so the "high" level section of the output signal "OUT" of the comparator C1 is reached to, for example, about 70% (Duty=70%).

In this way, a pulse width modulation of the output signal "OUT" is possible according to the input level of the signal Vin. However, the circuit of FIG. 9 must operate in the period "OSC", so faster response speed is needed for the comparator used in PWM circuit and operational amplifier used in the TWG. This leads to the drawback of increasing power consumption. In addition, the comparator operates in response to the level sifting of the input Vin, so wider input range operability is needed for the comparator. This leads to the drawback of increasing number of construction elements, increasing layout size, increasing power consumption. In addition, as the input level of Vin is shifted, so the common mode input characteristic of the comparator C1 deteriorates and a large offset voltage occurs according to the level of Vin when a supply voltage goes down. This leads to the drawback of decreasing the low voltage operation margin.

SUMMARY OF THE INVENTION

The object of the invention is thus to supply a PWM circuit that overcomes the drawbacks by decreasing power consumption, decreasing the layout size, and maintaining low voltage operation margin.

According to a first aspect of the present invention, there is provided a PWM circuit, the circuit comprises an output signal generation means for setting an output signal to "low" level when a logical level of oscillation signal at a first input terminal changes from "low" to "high" level, for resetting the output signal to "low" level in response to an effective input signal at a second terminal; a charge and discharge means for charging a first node (node1) coupled to a capacitor C0 when the output signal OUT stays in "low" level and for discharging the stored charge of the first node when the output signal OUT stays in "high" level; a comparing means for outputting an output signal to the second input terminal according to the level of the first node signal and the level of a reference voltage level(Vref0); a discharge current controlling means for controlling the stored charge on the first node, wherein the discharge current controlling means comprises a constant current outputting means for controlling the discharge current based on constant current.

According to a second aspect of the present invention, the constant current outputting means is constructed for outputting a constant current based on a resistance of a fixed resistor, the discharge current controlling means is comprised of an outputting means for outputting a current based on the constant current, a driving means is configured for outputting a current by the outputting means into a current path of the discharge current by using mirror effect.

According to a third aspect of the present invention, the charge and discharge means is comprised of an inverting circuit with a first conductive type MOS transistor and a second conductive type MOS transistor coupled serially, the driving means is comprised of a second conductive type MOS transistor with a current controlled by the outputted signal from the discharge current controlling means.

According to a forth aspect of the present invention, the charge and discharge means is comprised of an inverting circuit with a first conductive type MOS transistor and a second conductive type MOS transistor coupled in series, the driving means is comprised of a first MOS transistor and a second MOS transistor of a second conductive type coupled in parallel, the current of the second MOS transistor is controlled so that it maintains a constant current, a discharge current is configured by combining a current of the first MOS transistor and a current of the second MOS transistor.

According to a fifth aspect of the present invention, the charge and discharge means is comprised of a transfer gate with PMOS transistor and NMOS transistor coupled in parallel, a power voltage of the charge and discharge means is supplied by a voltage outputting means that varies the output voltage according to a reference voltage (Vref2), wherein the potential of the first node (node1) is thus varied.

According to the first aspect of the invention, because a triangle wave generator that consumes a large current flow constantly is not required, power consumption can be reduced. In the circuit of the invention, low level output timing of the comparing means does not depend on the pulse width of the output signal, therefore there is no problems to suppress the response speed of the comparing means, thus power consumption can be reduced.

According to the second aspect of the invention, control of the discharge current from node1 is done not by gate voltage of transistor but by current using mirror effect. Therefore, low power operation of the circuit can be stabilized significantly.

According to the third aspect of the invention, the charge and discharge means is comprised of inverting circuit with a PMOS transistor and a NMOS transistor coupled serially, and the NMOS transistor N1 is "off" at the charging period of the node1. Therefore flow-through current can be blocked, so power consumption can be reduced.

According to the forth aspect of the invention, adding to above said effects, a pulse width control can be done easily.

According to the fifth aspect of the invention, discharge time can be held constant even though power voltage may be changed. Therefore, a PWM circuit that does not depend on power voltage can be realized.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiment of the present invention will hereinafter described with reference to the accompanying drawings. Incidentally, the respective figures are merely approximate illustration to enable an understanding of the present invention.

First Preferred Embodiment

Figure 1:
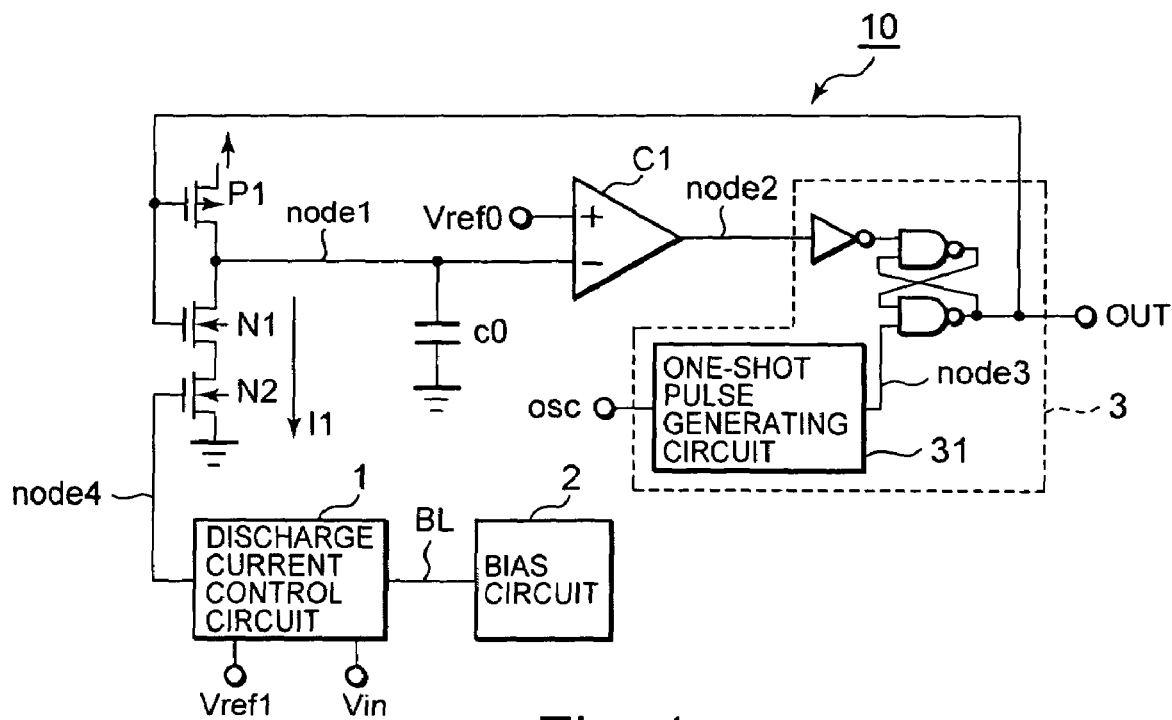
FIG. 1 is a diagram showing a configuration of a pulse width modulation (PWM) circuit according to a first embodiment of the present invention.

FIG. 1 is a diagram showing a configuration of a pulse width modulation (PWM) circuit according to a first embodiment of the present invention. The PWM circuit 10 is comprised of a PMOS transistor P1 for charging a node1, a NMOS transistor N1, N2 coupled serially to the PMOS transistor P1 for discharging stored charge on the node1 (an inverter comprised of a pair of the PMOS transistor P1 and the NMOS transistor N1 configures a charge and discharge means), a capacitor C0 coupled to the Node1, a comparator C1 that receives an input signal on the node1 and a reference signal Vref0, a discharge current control circuit that controls a fall-down time of a potential level of the node 1 by controlling a discharging current I1, a bias circuit 2 for generating a constant current and a PWM control circuit 3 that generates ON/OFF pulse signal for turning on and off the PMOS transistor P1 and the NMOS transistor N1 from a oscillator signal OSC and an output signal of the comparator C1 to control a charge and discharge current of node1.

Figure 4:
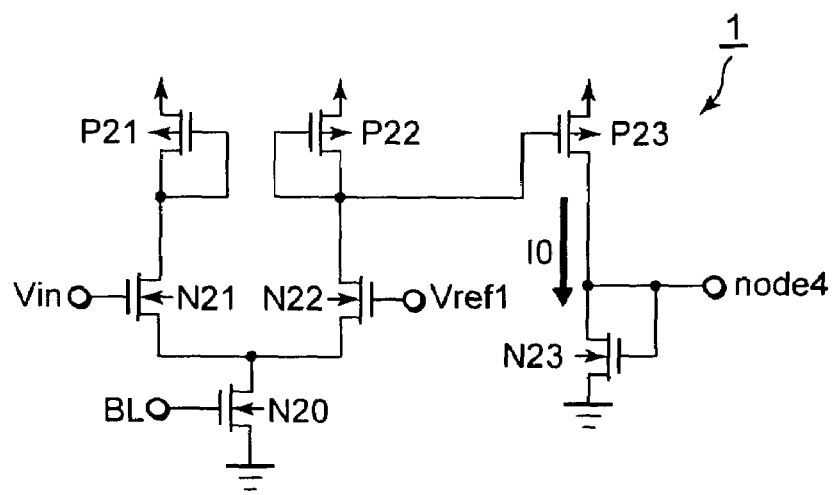
FIG. 4 is a diagram showing a configuration of a discharge current control circuit of the PWM circuit of the first embodiment of the present invention.

An output signal of a discharge current control circuit 1 for controlling a discharge current according to the input signals Vref1 and Vin is coupled to a gate of the NMOS transistor N2. FIG. 4 shows a configuration of this circuit.

Figure 2:
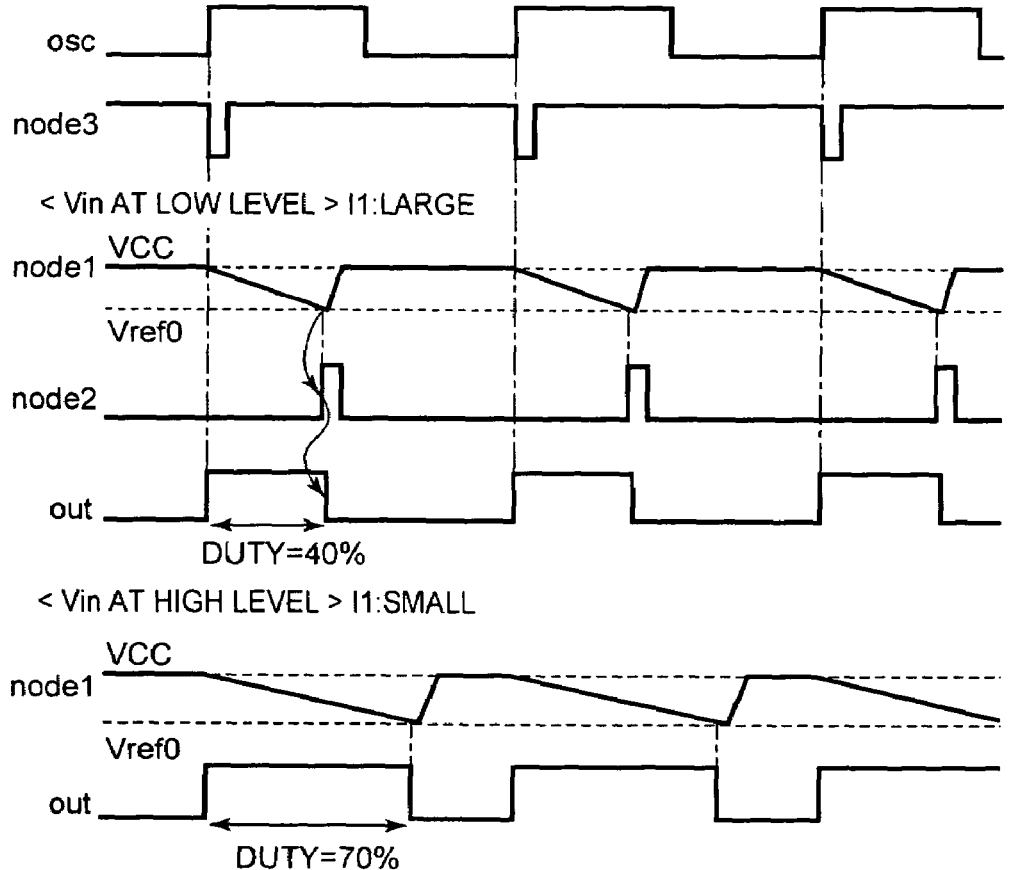
FIG. 2 is a timing chart showing an operation of the PWM circuit of the first embodiment of the present invention.

An operation of the PWM circuit of the first embodiment is described below with reference to the timing chart of FIG. 2. An output signal OUT of the PWM control circuit stays "low" when the oscillator signal OSC is at "low" level, therefore the PMOS transistor P1 is "on" and NMOS transistor N1 is "off". This causes the potential of node1 to charge up to a power supply voltage level VCC.

Figure 5:
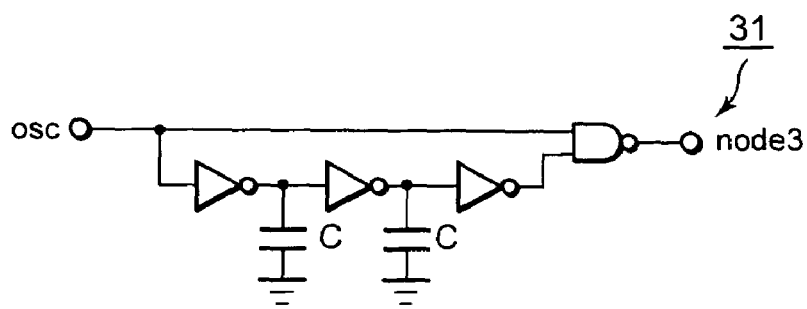
FIG. 5 is a diagram showing a configuration of a one-shot-pulse generating circuit 31 of the PWM circuit of the first embodiment of the present invention.

The one-shot pulse generating circuit 31 (FIG. 5 shows the details of this circuit) output an output signal to node3 and the potential of the node3 stays "low" in predetermined time when the signal OSC goes "high". This causes the output signal OUT of the PWM control circuit to "high" level, this turns the PMOS transistor P1 to "off" state and starts discharging of the charge stored in capacitor C0 coupled to the node1 through the NMOS transistor N1, N2.

At a time when the potential level of the node1 is lower than that of Vref0, the output signal at the node2 of the comparator C1 goes "high". This causes the output signal OUT of the PWM control circuit 3 to "low" level, and a charging process of the node1 is restarted to set the potential level of node1 to "high" level while the potential level of the node2 goes back to "low" level.

By repeating above mentioned operation, pulse width modulated wave signal is outputted from the output OUT. The pulse width of the wave signal is determined by capacitance of the capacitor C0 coupled to the node1 and discharge current I1, the amount of current is controlled by the discharge current control circuit 1.

Figure 3:
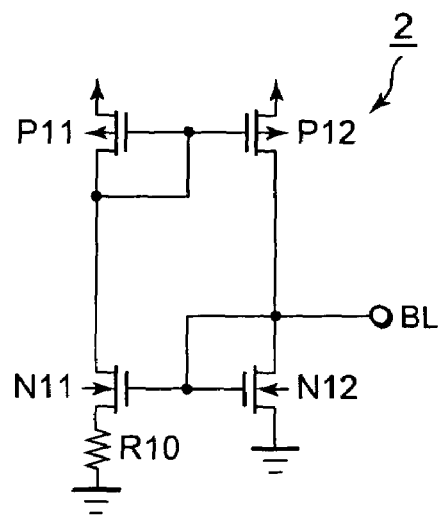
FIG. 3 is a diagram showing a configuration of a bias circuit 2 of the PWM circuit of the first embodiment of the present invention.

FIG. 3 shows a detail of the configuration of the bias circuit 2 that supplies a signal BL to the gate electrode of the NMOS transistor 20 of discharge current control circuit 20 in FIG. 4. The bias circuit 2 is comprised of PMOS transistor P11 and P12, NMOS transistor N11 and N12, and resister R10.

The operation of the bias circuit 2 is as follows. It is assumed that the dimension of the PMOS transistor P11 is N times the P12 and the dimension of the NMOS transistor N11 and N12 is the same. By mirror effect, the current of the PMOS transistor P12 is N times the current of the PMOS transistor P11 and the same current flows in NMOS transistor N12. Therefore N times the current of that of the PMOS transistor P11 want to flow in the NMOS transistor N11, but the current is squeezed by a resister R10 coupled to the source of the NMOS transistor N11 and the current becomes stable by being equalized to that of the PMOS transistor P11. It is assumed that the resistance of the resistor R10 is adjusted so as to control the current flow of the transistor N11 is 1/N of that of transistor N12. Overall current control as mentioned above makes it possible to stabilize the current flow of each transistor to the constant current determined by the resistance of the resister R10.

The operation of the discharge control circuit 1 will be described below with reference to FIG. 4. The discharge control circuit 1 is comprised of PMOS transistors P21-P23 and NMOS transistors N20-N23. The gate of the NMOS transistor N21 receives input voltage Vin and the gate of the NMOS transistor N22 receives the reference voltage Vref1.

The NMOS transistor N23 is configured to output an output signal from it drain at node4.

The gate of the NMOS transistor N20 receives output voltage BL of the bias circuit 2 and the source electrode is coupled to the ground, so the same current of NMOS transistor 12 of the bias circuit 2 flows because of the mirror effect if the dimension of two transistors is the same.

The current that flows in NMOS transistor N20 has constant current characteristic defied by the resistance R10 and the current value is not affected by the fluctuation of manufacturing process, therefore the current of transistor N20 has a stable constant current characteristics.

The current flow of the PMOS transistor P21 and P22 varies according to the input voltage level of Vin and the reference voltage Vref1, the current is splitted from the constant current of the NMOS transistor N20. If the voltage level of Vin is higher than that of Vref1 the current flow of transistor P21 is grater than that of transistor P22, on the other hand if the voltage level of Vin is lower than that of Vref1 the current flow of the transistor P21 is lower than that of transistor P22. The summing up current value of transistor P21 and P22 is equal to the current of the NMOS transistor N20.

The current of the PMOS transistor P22 is mirrored to the current I0 of PMOS transistor P23 by mirror effect, so the current is mirrored to the current of the NMOS transistor N2 of FIG. 1, the gate of which is coupled to the node4 of the NMOS transistor N23.

In the case that the voltage of Vin is lower than that of Vref1, the current flow of the PMOS transistor P22 is increased, so the current I0 of PMOS transistor P23 and the NMOS transistor N23 is increased and the discharge current I1 of the NMOS transistor N2 is increased. This causes a shorter discharge time of node1 and shorter "high" level pulse width of the output signal OUT of the PWM control circuit 3.

In the case that the voltage of Vin is higher than that of Vref1, the current flow of the PMOS transistor P22 is decreased, so the current I0 of the PMOS transistor and the NMOS transistor N23 is decreased and the discharge current I1 from the node1 is decreased. This causes the wider "high" level pulse width of the output signal OUT of the PWM control circuit 3.

Therefore it makes it possible to modulate the pulse width of the output signal OUT based on the control of the discharge current I1 according to the voltage level of the modulation input Vin and the reference level of Vref1 of the discharge current control circuit 1.

Figure 9:
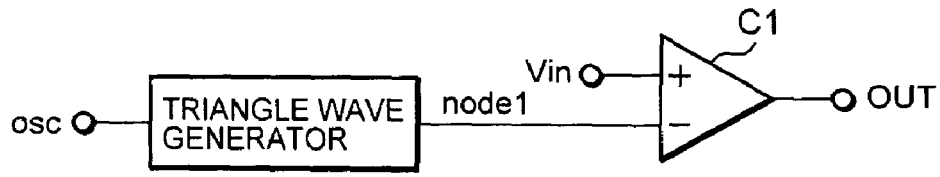
FIG. 9 is a diagram showing a configuration of a PWM circuit of a prior art.
Figure 10:
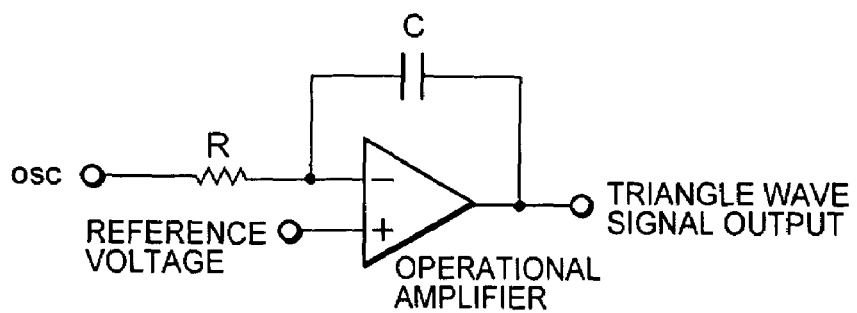
FIG. 10 is a diagram showing a configuration of a triangle wave generator in the PWM circuit of the prior art.
Figure 11:
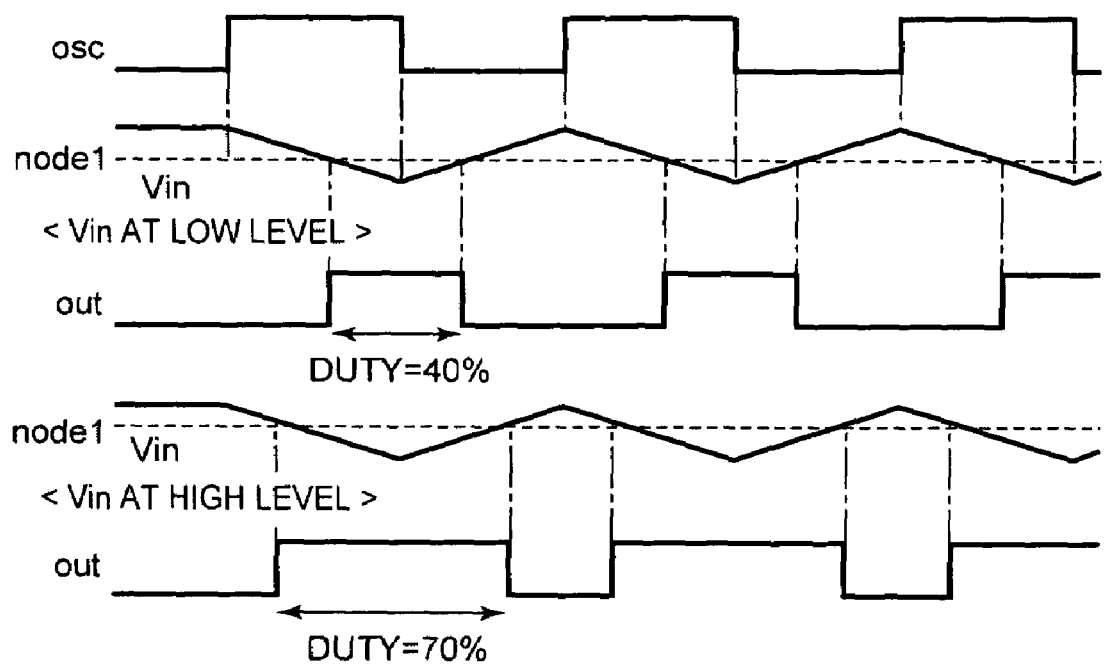
FIG. 11 is a diagram showing a timing chart showing an operation of the PWM circuit of the prior art.

According to the first preferred embodiment as described above, following advantages will be expected. (A) There is no need of triangle wave generator to flow large current constantly in the PWM circuit, so power consumption can be reduced. (B) In the PWM circuit described in FIG. 9 of related art, to obtain stable and high speed output pulse width, a "high" level and "low" level output signal need to be outputted at high speed, because the comparator C1 directly outputs a modulated signal. But in this embodiment, the "low" level timing of the comparator almost does not affect the output pulse width. Therefore, to suppress an output "low" level response speed almost has no effects and a low power circuit will be achieved.

(C) As the one input of the comparator is the reference signal Vref0 which has constant level, a circuit design may be possible depending on the level of the reference signal. Therefore, there is no need to design a circuit with a plurality of complex components matching to wider input range and the layout size may be reduced. As to common mode input characteristics, the voltage level of the reference signal Vref0 can be set to the level such that it causes no trouble even though the power voltage goes down. Therefore a lower voltage operation margin can be obtained.

(D) In this embodiment, the current of the NMOS transistor N2 is controlled by the current of the output transistor of the discharge current control circuit 1 that is controlled by current mirror effect. Therefore, the operation at a lower power voltage is stabilized compared to the discharge current control method by controlling the gate applied voltage.

Second Preferred Embodiment

Figure 6:
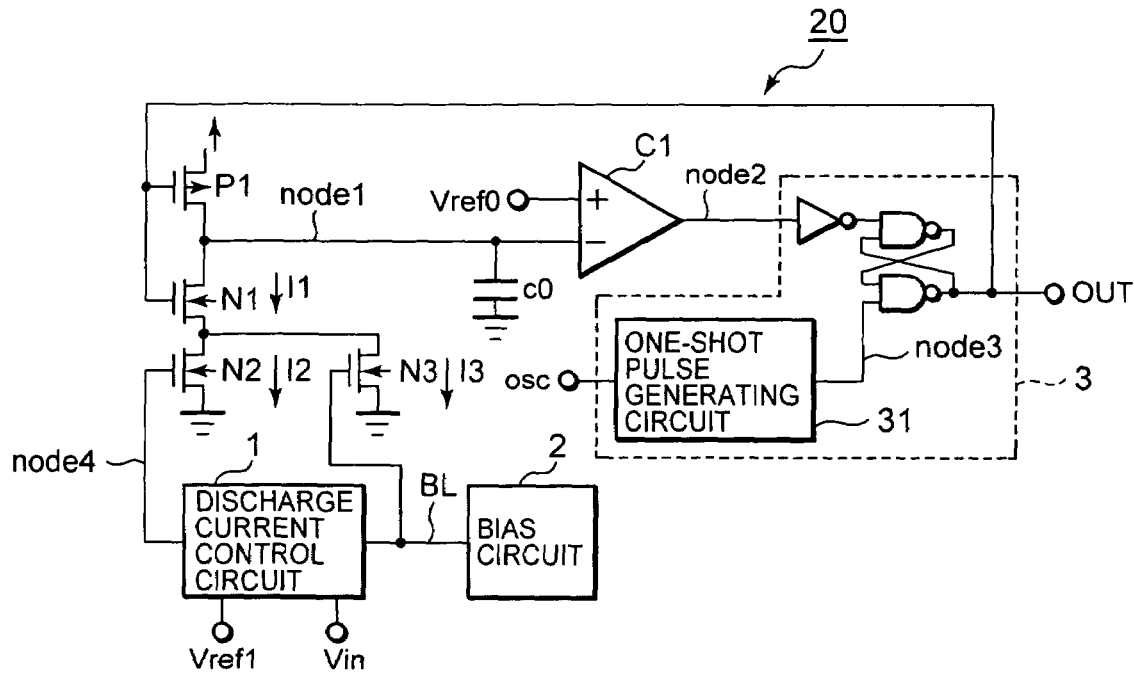
FIG. 6 is a diagram showing a configuration of a pulse width modulation (PWM) circuit according to a second embodiment of the present invention.

FIG. 6 is a diagram showing a configuration of a PWM circuit according to a second embodiment of the present invention. The PWM circuit 20 is different as to comprising a NMOS transistor N3 coupled parallel to the NMOS transistor N2. The gate of the NMOS transistor N3 is coupled to the output BL of the bias circuit 2 and the drain is commonly coupled to the source of the NMOS transistor N1, and the source of it is coupled to the ground.

The operation of this PWM circuit will now be explained below. The basic operation of the circuit is similar to that of the first embodiment. In this embodiment, discharge current I1 is the sum of the current I3 of the NMOS transistor N3 and the current I2 of the NMOS transistor N2.

When a dimension ratio of the NMOS transistor N12 of the bias circuit 2 and that of the NMOS transistor N3 of the PWM circuit 20 is in a predetermined ratio (e.g. 1:n), the relation I3=n*If is satisfied (the If is a constant current of the NMOS transistor N12). Therefore, in the case that n=1 and the dimension of the NMOS transistor N2, N3 is the same, the discharge current can be controlled within the range of reference current I3 to the twice of it, as the current I2 can be controlled within the range of minimum 0 to maximum If.

As stated above, the PWM circuit of the embodiment has advantage that an easier pulse width control can be achieved adding to that of the first preferred embodiment, because the control range of the discharge current I1 of the node1 extends from reference current I3 to the several fold of it.

Third Preferred Embodiment

Figure 7:
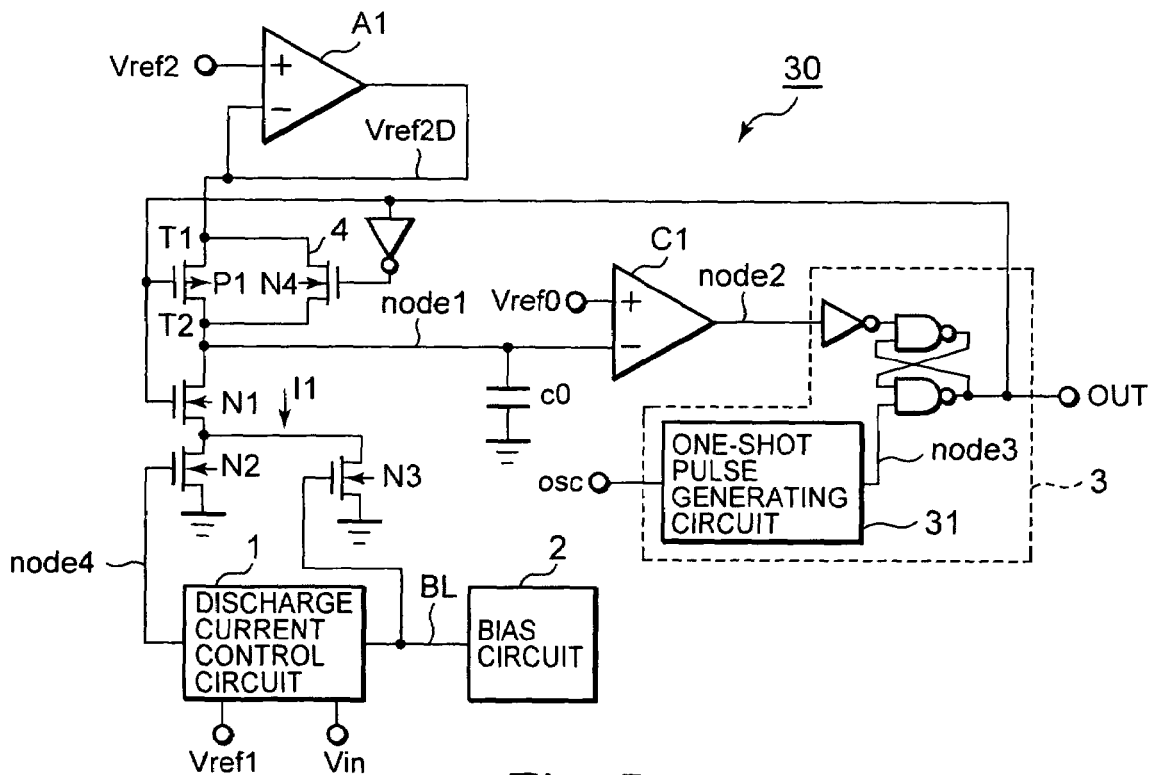
FIG. 7 is a diagram showing a configuration of a pulse width modulation (PWM) circuit according to a third embodiment of the present invention.
Figure 8:
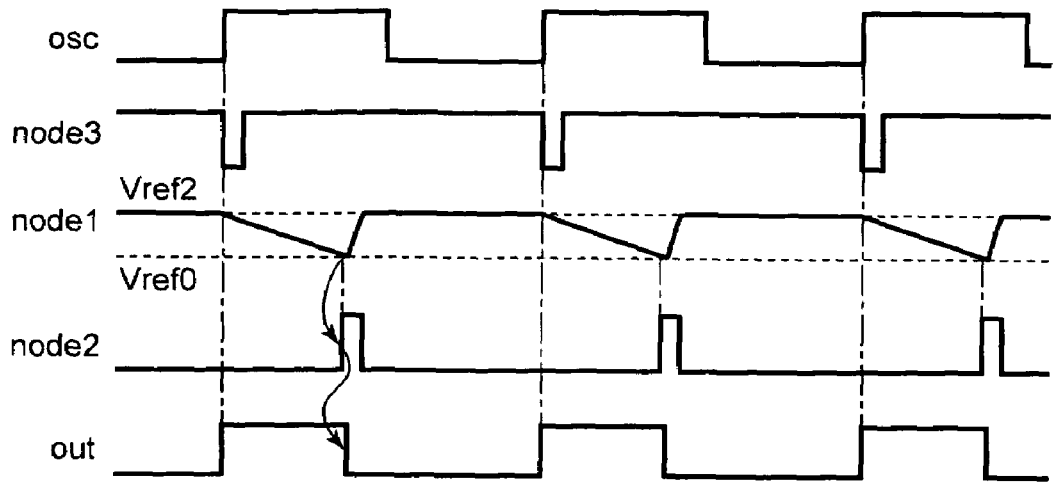
FIG. 8 is a timing chart showing an operation of the PWM circuit of the third embodiment of the present invention.

FIG. 7 is a diagram showing a configuration of a PWM circuit according to a third embodiment of the present invention. The PWM circuit 30 comprises a transfer gate 4 with PMOS transistor P1 and NMOS transistor N4 instead of the transistor P1 of the second preferred embodiment. The transfer gate 4 is controlled by the output signal OUT of the PWM control circuit 3. The circuit 30 also comprises an operational amplifier A1 which is configured as voltage follower with the input of reference voltage Vref2, the output of which is coupled to a terminal T1 of the transfer gate 4.

The operation of the PWM circuit 30 of the third preferred embodiment will now be described. The basic operation is similar to that of the first preferred embodiment, so only the difference of the operation will be described.

When the signal OSC is "low", the transfer gate 4 is "on" and the node1 is charged up to the output level vref2 of the operational amplifier A1. The voltage level of Vref2 is regulated and not dependent to the power voltage. Therefore the output node Vref2D of the operational amplifier A1 maintains the voltage level vref2 regardless of the power voltage.

In the PWM circuit 30 of this embodiment, the major difference is that the charging level of the node1 is set to the level vref2, and the other operation is similar to that of the second preferred embodiment. The charging level is maintained constant independent of the power voltage. Therefore the pulse width of the output OUT can be held constant even though the power voltage may change.

In this embodiment the transfer gate 4 is used instead of the PMOS transistor P1 of the second preferred embodiment. The reason of this is as follows. When the transfer gate is configured only by PMOS transistor, gate-source voltage VGS of PMOS transistor becomes low and power is supplied near the threshold voltage Vt of PMOS transistor. Therefore sufficient power cannot be applied and the problem that the delay of charging time of node1 is occurred. To solve the problem, the transfer gate is configured by the PMOS transistor of the first preferred embodiment and NMOS transistor N4 coupled parallel to it. In case of using a transfer gate, the gate-source voltage VGS of the NMOS transistor becomes high when output level of the operational amplifier A1 is low. Therefore NMOS transistor N4 is deeply on and sufficient charging current can be supplied to charge up the node1, whereas the charging process is mainly executed by PMOS transistor in the case that voltage level of the node Vref2d is sufficiently high.

As mentioned above, according to the third preferred embodiment, charging time of node1 is maintained constant even though a power voltage may change. Therefore a power-voltage independent PWM circuit can be realized.

In the preferred embodiment of the invention, generally usable circuits can be applicable in each circuit blocks, so details of the configuration of the comparator and the operational amplifier is not described. As for the discharge current control circuit 1, the input circuit of it may be configured by PMOS transistor instead of NMOS transistor.

What is claimed is:

1. A pulse width modulation circuit comprises:

an output signal generation means for setting an output signal to "low" level when a logical level of oscillation signal at a first input terminal changes from "low" to "high" level, for resetting the output signal to "low" level in response to an effective input signal at a second terminal;

a charge and discharge means for charging a first node (node1) coupled to a capacitor C0 when the output signal OUT stays in "low" level and for discharging the stored charge of the first node when the output signal OUT stays in "high" level;

a comparing means for outputting an output signal to the second input terminal according to the level of the first node signal and the level of a reference voltage level (Vref0); and a discharge current controlling means for controlling the stored charge on the first node, wherein the discharge current controlling means comprises a constant current outputting means for controlling the discharge current based on constant current.

2. The pulse width modulation circuit according to claim 1, wherein the constant current outputting means is constructed for outputting a constant current based on a resistance of a fixed resistor, the discharge current controlling means is comprised of an outputting means for outputting a current based on the constant current, a driving means is configured for outputting a current by the outputting means into a current path of the discharge current by using mirror effect.

3. The pulse width modulation circuit according to claim 2, wherein the charge and discharge means is comprised of an inverting circuit with a first conductive type MOS transistor and a second conductive type MOS transistor coupled serially, the driving means is comprised of a second conductive type MOS transistor with a current controlled by the outputted signal from the discharge current controlling means.

4. The pulse width modulation circuit according to claim 2, wherein the charge and discharge means is comprised of an inverting circuit with a first conductive type MOS transistor and a second conductive type MOS transistor coupled in series, the driving means is comprised of a first MOS transistor and a second MOS transistor of a second conductive type coupled in parallel, the current of the second MOS transistor is controlled so that it maintains a constant current, discharge current is configured by combining a current of the first MOS transistor and a current of the second MOS transistor.

5. The pulse width modulation circuit according to claim 4, wherein the charge and discharge means is comprised of a transfer gate with PMOS transistor and NMOS transistor coupled in parallel, a power voltage of the charge and discharge means is supplied by a voltage outputting means that varies the output voltage according to a reference voltage (Vref2), wherein the potential of the first node (node1) is thus varied.

* * * * *